United States Patent
Nawa

(10) Patent No.: US 7,056,851 B2
(45) Date of Patent: Jun. 6, 2006

(54) ZRO₂-AL₂O₃ COMPOSITE CERAMIC MATERIAL

(75) Inventor: Masahiro Nawa, Katano (JP)

(73) Assignee: Matsushita Electric Works, Ltd., Kadoma (JP)

( * ) Notice: Subject to any disclaimer, the term of this patent is extended or adjusted under 35 U.S.C. 154(b) by 26 days.

(21) Appl. No.: 10/921,841

(22) Filed: Aug. 20, 2004

(65) Prior Publication Data

US 2005/0079971 A1    Apr. 14, 2005

(30) Foreign Application Priority Data

Aug. 22, 2003    (JP) .............................. 2003-299092

(51) Int. Cl.
    *C04B 35/119*    (2006.01)
(52) U.S. Cl. .................................... 501/105
(58) Field of Classification Search ................ 501/105
    See application file for complete search history.

(56) References Cited

U.S. PATENT DOCUMENTS

| | | | |
|---|---|---|---|
| 4,820,666 A * | 4/1989 | Hirano et al. ................ 501/104 |
| 4,820,667 A * | 4/1989 | Tsunekawa et al. ......... 501/104 |
| 4,853,353 A * | 8/1989 | Whalen et al. ............. 501/103 |
| 5,525,560 A | 6/1996 | Yamazaki et al. |
| 5,658,837 A * | 8/1997 | Quadir ........................ 501/103 |
| 5,728,636 A | 3/1998 | Nawa et al. |
| 5,854,158 A | 12/1998 | Nawa et al. |
| 5,863,850 A | 1/1999 | Nawa et al. |
| 5,994,250 A * | 11/1999 | Suzuki et al. ................. 501/87 |
| 2002/0198602 A1 | 12/2002 | Nawa et al. |
| 2004/0067839 A1 | 4/2004 | Nawa et al. |
| 2005/0049137 A1 * | 3/2005 | Shikata et al. .............. 501/105 |

FOREIGN PATENT DOCUMENTS

| | | |
|---|---|---|
| EP | 1 228 774 A1 | 8/2002 |
| JP | 63-123861 | 5/1988 |
| JP | 63-156063 | 6/1988 |
| WO | WO 02/11780 A1 | 2/2002 |

* cited by examiner

*Primary Examiner*—Karl Group
(74) *Attorney, Agent, or Firm*—Oblon, Spivak, McClelland, Maier & Neustadt, P.C.

(57) ABSTRACT

A $ZrO_2$—$Al_2O_3$ composite ceramic material is provided, which is excellent in mechanical strength and toughness, and has the capability of preventing low temperature degradation. This ceramic material includes a first phase of $ZrO_2$ grains having an average grain size of 0.1 to 0.8 μm, and containing 10 to 12 mol % of $CeO_2$ and 0.005 mol % to less than 0.5 mol % of $Y_2O_3$, and a second phase of $Al_2O_3$ grains having an average grain size of 0.1 to 0.5 μm. The $ZrO_2$ grains is composed of 90 vol % or more of tetragonal $ZrO_2$, and a content of the second phase in the composite ceramic material is in a range of 20 to 60 vol %, and preferably 30 to 50 vol %.

20 Claims, No Drawings

$ZRO_2$-$AL_2O_3$ COMPOSITE CERAMIC MATERIAL

BACKGROUND OF THE INVENTION

1. Field of the Invention

The present invention relates to a $ZrO_2$—$Al_2O_3$ composite ceramic material having excellent mechanical properties and the capability of preventing low temperature degradation.

2. Disclosure of the Prior Art

In contrast to typical ceramic materials such as alumina, silicon nitride and silicon carbide, yttria-stabilized tetragonal zirconia polycrystals (Y-TZP) containing 2 to 3 mol % of $Y_2O_3$ as a stabilizer demonstrate excellent mechanical properties, e.g., high strength and high toughness, and therefore is already widely in practical use. In recent years, the Y-TZP ceramic is beginning to be applied as a biomaterial for artificial joints, artificial tooth roots, abutment, crown and so on.

However, the Y-TZP ceramic has a problem that a phase transformation from metastable tetragonal $ZrO_2$ to monoclinic $ZrO_2$ proceeds at a relatively low temperature region, e.g., 200 to 300° C., while accompanying a volume expansion of about 4.6%. Due to microcracks developed in the Y-TZP ceramic by this volume expansion, a considerable deterioration in mechanical properties occurs. In addition, it is well known that the phase transformation is further accelerated under a wet condition (e.g., in vivo environments). As one of major causes for such a low temperature degradation of the Y-TZP ceramic, it is believed that trivalent yttrium ions are interstitially dissolved in eight-coordinate positions of tetravalent zirconium ions, so that oxygen defects are generated in $ZrO_2$ lattice by the difference in valence level.

On the other hand, ceria-stabilized tetragonal zirconia polycrystals (Ce-TZP) containing $CeO_2$ as the stabilizer are also widely known. In this case, since tetravalent cerium ions are dissolved into the $ZrO_2$ lattice, the oxygen defects are not generated. It has been supported by lots of experimental data that the low temperature degradation of the Ce-TZP ceramic does not happen crystallographically. In addition, this ceramic demonstrates a remarkably high toughness. However, there is a problem that the mechanical strength and hardness of the Ce-TZP ceramic are much lower than those of the Y-TZP ceramic. Consequently, it has been a significant barrier to the practical use.

For example, as disclosed in Japanese Patent Early Publication No. 63-156063 or No. 63-123861, both of ceria and yttria is used as the stabilizer to obtain a high-strength $ZrO_2$ sintered body. This $ZrO_2$ sintered body includes a partially stabilized zirconia mainly composed of tetragonal $ZrO_2$ or tetragonal $ZrO_2$ and cubic $ZrO_2$, which contains 4 to 6 mol % of ceria ($CeO_2$) and 2 to 6 mol % of yttria ($YO_{1.5}$) as the stabilizer, and a second phase of at least one selected from alumina, spinel and mullite. In this case, it is believed that thermal stability is improved because $ZrO_2$ of this sintered body has a structure closer to a cubic crystal that is the high-temperature stable phase of $ZrO_2$, as compared with the tetragonal $ZrO_2$ containing only yttria as the stabilizer.

However, there is another problem that, during sintering, crystal grains of the cubic $ZrO_2$ easily become larger in size than the case of the tetragonal $ZrO_2$. That is, abnormal grain growth of $ZrO_2$ easily occurs. Therefore, it is difficult to ensure sufficient strength, hardness and wear resistance with reliability. In addition, the presence of the second phase such as alumina and mullite makes difficult to complete the sintering of $ZrO_2$ matrix containing yttria as the stabilizer. As a result, a specialized sintering technique such as pressure sintering or HIP will be needed to obtain a dense sintered body. This leads to an increase in production cost and restricts the production of a sintered body having a complex shape.

SUMMARY OF THE INVENTION

Therefore, a concern of the present invention is to provide a $ZrO_2$—$Al_2O_3$ composite ceramic material, which is excellent in mechanical strength and toughness, and has the capability of substantially conquering the problem of low temperature degradation.

That is, the ceramic material of the present invention comprises a first phase of $ZrO_2$ grains having an average grain size of 0.1 to 0.8 μm, and containing 10 to 12 mol % of $CeO_2$ and 0.005 mol % to less than 0.5 mol % of $Y_2O_3$, and a second phase of $Al_2O_3$ grains having an average grain size of 0.1 to 0.5 μm. The $ZrO_2$ grains are composed of 90 vol % or more of tetragonal $ZrO_2$, and a content of the second phase in the composite ceramic material is in a range of 20 to 60 vol %.

In general, it is said that 2 to 3 mol % of $Y_2O_3$ is needed as the stabilizer for tetragonal $ZrO_2$. In contrast thereto, the present invention is essential to use a required amount of $CeO_2$ as the stabilizer in combination with an extremely small amount of $Y_2O_3$. In this case, it is interesting to note that the stabilizer function is hardly expected by the addition of $Y_2O_3$. That is, one of important findings in the present invention is in that the use of 10 to 12 mol % of $CeO_2$ as the stabilizer in combination with 0.005 to less than 0.5 mol % of $Y_2O_3$ is effective to remarkably improve poor mechanical properties that are major disadvantages of the Ce-TZP ceramic, and simultaneously prevent the low temperature degradation that is a major disadvantage of the Y-TZP ceramic. Thus, the technical concept of the present invention is different from the conventional technical concept of improving thermal stability of the Y-TZP ceramic by using both of $CeO_2$ and $Y_2O_3$ as the stabilizer.

These and still other objects and advantages of the present invention will become more apparent from the detail description of the invention and preferred examples explained below.

DETAIL DESCRIPTION OF THE INVENTION

A $ZrO_2$—$Al_2O_3$ composite ceramic material of the present invention and a production method thereof are explained in detail below.

The $ZrO_2$—$Al_2O_3$ composite ceramic material of the present invention is essential to use $ZrO_2$ grains containing 10 to 12 mol % of $CeO_2$ and 0.005 mol % to less than 0.5 mol % of $Y_2O_3$ as the first phase. As described before, $CeO_2$ plays an important role as the stabilizer for tetragonal $ZrO_2$ with the capability of preventing the low temperature degradation. When the $CeO_2$ content is in the range of 10 to 12 mol %, the $ZrO_2$ grains of the first phase is composed of 90 vol % or more of tetragonal $ZrO_2$. Even when monoclinic $ZrO_2$ appears in the first phase, its content is less than 10 vol %. At this time, there is no generation of cubic $ZrO_2$. Therefore, mechanical strength and toughness can be effectively improved according to the stress-induced phase transformation effect of $ZrO_2$. On the other hand, when the $CeO_2$ content is less than 10 mol %, the amount of monoclinic $ZrO_2$ relatively increases, so that microcracks easily develop in the composite ceramic material. This leads to a considerable decrease in mechanical strength. When the $CeO_2$ content is more than 12 mol %, the cubic $ZrO_2$ of the high-temperature stable phase begins to appear in the composite ceramic material. When the amount of tetragonal $ZrO_2$ becomes less than 90 vol % due to the generation of the cubic $ZrO_2$, sufficient mechanical strength and toughness can not be obtained.

By the way, it is already known that 2 to 3 mol % of $Y_2O_3$ is used as the stabilizer for tetragonal $ZrO_2$. On the other hand, the present invention is essential to use an extremely small, limited range, i.e., 0.005 to less than 0.5 mol %, of $Y_2O_3$ with respect to the total amount of $ZrO_2$. Therefore, in the present invention, the stabilizer effect of $Y_2O_3$ can not be expected. In other words, when less than 0.5 mol % of $Y_2O_3$ is added to $ZrO_2$ by itself, the monoclinic $ZrO_2$ becomes dominant. Thus, the stabilizer effect can not be obtained by use of the small amount of $Y_2O_3$.

However, the present inventors found that by using 10 to 12 mol % of $CeO_2$ in combination with the small amount of $Y_2O_3$, both of the problem of low temperature degradation that is a disadvantage of the Y-TZP ceramic and the problem of poor mechanical strength that is a disadvantage of the Ce-TZP ceramic can be solved simultaneously. In the present invention, when the content of $Y_2O_3$ is less than 0.005 mol %, the effect of inhibiting abnormal grain growth of $ZrO_2$ becomes insufficient, so that improvements of the mechanical strength and hardness of the composite ceramic material can not be achieved. On the other hand, when the content of $Y_2O_3$ is larger than 0.5 mol %, the stabilizer effect of $Y_2O_3$ gradually begins to appear. It means that the low temperature degradation becomes a problem.

In the case of using $CeO_2$ as the stabilizer for tetragonal $ZrO_2$ in combination with the small amount of $Y_2O_3$, without wishing to be bound by theory, it is believed that an inhibiting mechanism of abnormal grain growth described below play an important role to improve the mechanical properties of the $ZrO_2$—$Al_2O_3$ composite ceramic material.

That is, Chen et al (S. L. Hwang and I-W Chen J. Am. Ceram. Soc., 73, 3269 (1990)) reported that effects of various dopants on the grain growth of ceria stabilized tetragonal $ZrO_2$ grains were investigated, and as the dopant has a smaller valence level than $Ce^{4+}$, the inhibition of grain growth increases. In addition, it was reported that when the dopant has the same valence level as $Ce^{4+}$, the inhibition of grain growth is further increased by the dopant having a larger ionic radius than $Ce^{4+}$. Therefore, it is believed that the effect of grain-growth inhibition, observed in the present invention, is caused by the presence of $Y^{3+}$ having a smaller valence level than $Ce^{4+}$, and a larger ionic radius ($1.019 \times 10^{-1}$ nm) than $Ce^{4+}$ ($0.97 \times 10^{-1}$ nm).

Moreover, Ikuhara et al (Y. Ikuhara, T. Sakuma, Ceramics, 32, 524 (1997)) reported that a localized composition analysis for grain boundary of a Y-TZP ceramic having a stable grain-boundary structure and a uniform grain-size distribution was performed, and segregation of yttrium (Y) was observed at a region having a width of several nanometers in the vicinity of the grain boundary. As in the case of the Y-TZP ceramic, there is a possibility that a similar segregation of Yttrium in the vicinity of grain boundary happens in the Ce-TZP ceramic. It is believed that the occurrence of such a segregation in the vicinity of grain boundary lowers the mobility of grain boundary and enhances the effect of grain growth inhibition.

In the present invention, the $ZrO_2$ grains of the first phase have an average grain size of 0.1 to 0.8 µm. When the average grain size is more than 0.8 µm, it leads to reductions in mechanical strength and wear resistance of the composite ceramic material or variations in mechanical properties. On the other hand, it is difficult to realize the first phase having the average grain size of less than 0.1 µm in the composite ceramic material. In particular, since pressure sintering or HIP treatment is needed to obtain a dense sintered body, a deterioration of cost performance and a decrease in production yield come into problems. In addition, it becomes difficult to disperse fine $Al_2O_3$ grains efficiently within the $ZrO_2$ grains in order to form a "nano composite structure" described later in the composite ceramic material of the present invention.

In the present invention, it is also preferred that a ratio of the number of the $ZrO_2$ grains that are two or more times larger than the average grain size of the first phase relative to the number of the entire $ZrO_2$ grains dispersed in the composite ceramic material is 10% or less. This ratio can be achieved by use of the above-defined amounts of $CeO_2$ and $Y_2O_3$. If necessary, the first phase may further contain titania, magnesia, calcia or a small amount of impurities.

In addition, the second phase of the $ZrO_2$—$Al_2O_3$ composite ceramic material of the present invention is essentially composed of $Al_2O_3$ grains having an average grain size of 0.1 to 0.5 µm. When the average grain size is less than 0.1 µm, aggregation of the $Al_2O_3$ grains begins to appear, and it becomes difficult to distribute the $Al_2O_3$ grains uniformly in the first phase. It leads to variations in mechanical properties. On the other hand, when the average grain size is more than 0.5 µm, wear resistance and hardness of the ceramic composite material decrease. In particular, since the $Al_2O_3$ grains can not be dispersed efficiently within the $ZrO_2$ grains of the first phase, it becomes difficult to form the "nano composite structure" described above in the composite ceramic material.

In addition, the composite ceramic material of the present invention is essential to contain 20 to 60 vol %, and preferably 30 to 50 vol % of $Al_2O_3$ grains. When the $Al_2O_3$ content is less than 20 vol %, the mechanical strength and the wear resistance of the composite ceramic material can not be sufficiently improved. Moreover, the ratio of the number of the $ZrO_2$ grains that are two or more times larger than the average grain size of the first phase relative to the number of the entire $ZrO_2$ grains dispersed in the composite ceramic material easily becomes more than 10%. On the other hand, as the $Al_2O_3$ content exceeds 50 vol %, the mechanical strength gradually decreases due to an increase in aggregation of $Al_2O_3$ grains. When the $Al_2O_3$ content is more than 60 vol %, a considerable decrease in mechanical strength and toughness occurs because the matrix phase is composed of $Al_2O_3$. When the composite ceramic material contains 30 to 50 vol % of the second phase, it is possible to provide the ceramic composite material having well-balanced mechanical strength and toughness in higher levels.

In the present invention, it is preferred that a fine $Al_2O_3$ grains are dispersed within the $ZrO_2$ grains to form the "nano composite structure in the composite ceramic material. To obtain the "nano-composite structure", an appropriate degree of grain growth of the $ZrO_2$ grains is needed. However, the excessive grain growth causes deteriorations in mechanical strength, hardness and wear resistance. In the present invention, the appropriate degree of grain growth of the $ZrO_2$ grains can be achieved by use of the above-defined amounts of $CeO_2$ and $Y_2O_3$. In this case, it is also preferred that a ratio of the number of the $Al_2O_3$ grains dispersed within the $ZrO_2$ grains relative to the number of the entire $Al_2O_3$ grains dispersed in the composite ceramic material is 2% or more.

Advantages brought by the induction of the "nano-composite structure" into the composite ceramic material are briefly explained. First, the $ZrO_2$ grains of the first phase can be remarkably reinforced by the formation of the "nano-composite" structure. In addition, the uniform of the fine structure in the absence of abnormal grain growth mainly presents excellent wear resistance. Without wishing to be bound by theory, it is presently believed that one of the reasons for the unexpected improvement is based on the formation of sub-grain boundaries within the $ZrO_2$ grains due to piled up dislocations, which play a role in imaginary dividing the $ZrO_2$ grains into more finer sized grains.

That is, when fine $Al_2O_3$ grains of the second phase are dispersed within the $ZrO_2$ grains of the first phase, a residual stress field is locally generated around each of fine $Al_2O_3$ grains dispersed within the $ZrO_2$ grains by a difference in thermal expansion coefficient between $Al_2O_3$ and $ZrO_2$ during a cooling procedure after sintering. By the influence of this residual stress field, lots of dislocations occur within the respective $ZrO_2$ grains. The dislocations are then piled up with each other, and finally the sub-grain boundaries are formed. The sub-grain boundaries provide the finer-grained structure, which has the capability of increasing a critical stress required for causing the stress-induced phase transformation from the tetragonal $ZrO_2$ to the monoclinic $ZrO_2$. As a result, the composite ceramic material of the present invention demonstrates high mechanical strength and toughness as well as excellent wear resistance and hardness.

Therefore, the additive amounts of $Y_2O_3$ and $CeO_2$ defined in the present invention were determined to prevent the low temperature degradation, and also achieve the appropriate grain growth of the $ZrO_2$ grains required to the formation of the "nano-composite structure" to improve mechanical strength and toughness of the composite ceramic material.

The composite ceramic material of the present invention is particularly suitable for applications needing wear resistance. For example, it is preferred to use the composite ceramic material of the present invention for an artificial joint described in the International Publication WO 02/11780A1. That is, when a joint portion of the artificial joint is provided by a sliding contact between the composite ceramic material and polyethylene, it is possible to remarkably reduce a wear amount of polyethylene. In addition, when the joint portion of the artificial joint is provided by a sliding contact between the composite ceramic materials, excellent wear resistance can be achieved. Thus, the use of the composite ceramic material of the present invention is useful to obtain the artificial joint having the capability of stably providing a smooth joint motion for an extended time period under severe in-vivo conditions.

Next, the method of producing the $ZrO_2$—$Al_2O_3$ composite ceramic material of the present invention is explained in detail. This production method comprises the steps of preparing a first ingredient for providing the $ZrO_2$ grains of the first phase and a second ingredient for providing the $Al_2O_3$ grains of the second phase, mixing the first ingredient with the second ingredient such that a content of the second phase in the composite ceramic material is in the range of 20 to 60 vol %, and more preferably 30 to 50 vol %, molding a resultant mixture in a desired shape to obtain a green compact, and sintering the green compact at a required sintering temperature in an oxygen-containing atmosphere.

The first ingredient is prepared such that the $CeO_2$ and $Y_2O_3$ contents in the first phase of the composite ceramic material are in the ranges of 10 to 12 mol % and 0.005 to less than 0.5 mol %, respectively, and the first phase is composed of 90 vol % or more of tetragonal $ZrO_2$. For example, as the first ingredient, it is preferred to use a tetragonal $ZrO_2$ powder obtained by allowing $ZrO_2$ to form a sold solution with the above-defined amounts of $CeO_2$ and $Y_2O_3$.

Alternatively, the tetragonal $ZrO_2$ powder may be prepared by the following method. That is, a cerium containing compound such as cerium salts and a yttrium containing compound such as yttrium salts are added to an aqueous solution of a zirconium salt. Then, hydrolysis is performed by adding an alkali aqueous solution such as aqueous ammonia to a resultant mixture solution to obtain a precipitate. The precipitate is dried, calcined in the oxygen-containing atmosphere, e.g., in the air, and then pulverized by means of wet ball milling to obtain the tetragonal $ZrO_2$ powder having a desired particle distribution The second ingredient is prepared such that $Al_2O_3$ grains are dispersed in the composite ceramic material after sintering. For example, it is preferred to prepare the $Al_2O_3$ powder having a desired particle distribution by adding an alkali aqueous solution such as aqueous ammonia to an aqueous solution of an aluminum salt to perform hydrolysis, drying a resultant precipitate, calcining the precipitate in the oxygen-containing atmosphere, e.g., in the air, and pulverizing the calcined precipitate by means of wet ball milling. Alternatively, a marketed $Al_2O_3$ powder may be used.

It is preferred to perform the sintering step at a sintering temperature of 1400 to 1500° C. in the oxygen containing atmosphere. In the sintering step, it is important to satisfy the conditions that the average grain sizes of the $ZrO_2$ grains of the first phase and the $Al_2O_3$ grains of the second phase are in the ranges of 0.1 to 0.8 μm, and 0.1 to 0.5 μm, respectively. More preferably, the sintering condition is determined such that the ratio of the number of the $Al_2O_3$ grains dispersed within the $ZrO_2$ grains relative to the number of the entire $Al_2O_3$ grains dispersed in the composite ceramic material is 2% or more.

By the way, a mobility of grain boundary that is an index for sintering is much higher in the Ce-TZP ceramic containing $CeO_2$ as the stabilizer than the Y-TZP or alumina ceramic. Therefore, the composite ceramic material containing the Ce-TZP ceramic can be densely sintered by means of pressureless sintering without using pressure sintering or a HIP (hot isostatic pressing) treatment. However, the HIP treatment may be performed in the oxygen-containing atmosphere after sintering, if necessary. To obtain the effects of the HIP treatment at the maximum, it is preferred that the sintered body of the composite ceramic material obtained by the sintering step has a relative density of 95% or more. A concentration of oxygen in the oxygen-containing atmosphere in the sintering step is not specifically limited. A mixture gas of oxygen and an inert gas such as argon may be used. In this case, it is preferred that the concentration of oxygen is approximately 5 vol % or more with respect to a total volume of the mixture gas.

EXAMPLES

Preferred examples of the present invention are explained below. However, needless to say, the present invention is not limited to these examples.

Examples 1 to 20 and Comparative Examples 1 to 5

A $ZrO_2$—$Al_2O_3$ composite ceramic material of each of Examples 1 to 20 was produced by the following method. That is, as the first ingredient for providing $ZrO_2$ grains that are the first phase of the composite ceramic material, a tetragonal $ZrO_2$ powder having a specific surface of 15 $m^2/g$ and containing required amounts of $CeO_2$ and $Y_2O_3$ listed in Table 1 or 2 was used. On the other hand, as a second ingredient for providing $Al_2O_3$ grains that are the second phase of the composite ceramic material, an $\alpha$-$Al_2O_3$ powder having an average particle size of 0.2 μm was used.

Next, a required amount of the $\alpha$-$Al_2O_3$ powder listed in Tables 1 and 2 was added to the tetragonal $ZrO_2$ powder, and then mixed in ethanol for 24 hours by means of wet ball milling. A resultant mixture was dried to obtain a mixed powder. The mixed powder was molded at the pressure of 10 MPa by uniaxial pressing with a die having a diameter of about 68 mm to obtain a disk-shaped green compact. Next, a CIP (cold isostatic pressing) treatment was performed to the green compact at the pressure of 147 MPa. Finally, the green compact was sintered at the sintering temperature of 1450° C. for 2 hours in the air by pressureless sintering to obtain a sintering body.

The $ZrO_2$—$Al_2O_3$ composite ceramic material of Comparative Example 1 was produced by the same method as Example 1 except that $Y_2O_3$ was not added. The $ZrO_2$—$Al_2O_3$ composite ceramic material of Comparative Example 2 was produced by the same method as Example 1 except for the addition of 1 mol % of $Y_2O_3$. In addition, the $ZrO_2$—$Al_2O_3$ composite ceramic materials of Comparative Examples 3 to 5 were produced by the same method as Example 1 except that the $Al_2O_3$ content is out of the range of the present invention, as listed in Table 2.

With respect to each of Examples 1 to 20 and Comparative Examples 1 to 5, the sintered body has a relative density of more than 99%. From results of X-ray diffraction analysis, it was confirmed that the first phase of the respective sintered body is composed of more than 95 vol % of tetragonal $ZrO_2$ and the balance of monoclinic $ZrO_2$. There was no X-ray profile showing the presence of cubic $ZrO_2$. From the SEM (scanning electron microscope) and TEM (transmission electron microscope) observations of the sintered body, it was confirmed that the sintered body has a nano-composite structure characterized in that fine $Al_2O_3$ grains of the second phase are dispersed within the $ZrO_2$ grains of the first phase.

As listed in Tables 1 and 2, average grain sizes of the first and second phases of the sintered body measured from the SEM and TEM observations are respectively in the ranges of 0.3 to 0.8 μm, and 0.2 to 0.5 μm. Moreover, to evaluate mechanical properties of the composite ceramic material, test specimens having the dimensions of 4 mm×3 mm×40 mm were prepared from the sintered body. Subsequently, 3-point bending strength and fracture toughness were measured at room temperature by use of the test specimens. The fracture toughness was determined by the IF method. Results are listed in Tables 3 and 4.

In addition, an $Al_2O_3$ dispersion ratio (W1), which is defined as a ratio of the number of the $Al_2O_3$ grains dispersed within the $ZrO_2$ grains relative to the number of the entire $Al_2O_3$ grains dispersed in the composite ceramic material, and a $ZrO_2$ dispersion ratio (W2), which is defined as a ratio of the number of the $ZrO_2$ grains that are two or more times larger than the average grain size of the first phase relative to the number of the entire $ZrO_2$ grains dispersed in the composite ceramic material, were determined by the following method. First, a sample was prepared by polishing and heat-treating the sintered body. Then, the SEM or TEM observations of the sample was performed to counting the number (S1) of entire $Al_2O_3$ grains of the second phase within a view field, the number (n1) of fine $Al_2O_3$ grains dispersed in the $ZrO_2$ grains of the first phase within the same view field, the number (S2) of the entire $ZrO_2$ grains of the first phase within the same view field, and the number (n2) of the $ZrO_2$ grains that are two or more times larger than the average grain size of the first phase within the same view field. By substituting these values to the following equations, the $Al_2O_3$ and $ZrO_2$ dispersion ratios were calculated. Results are shown in Tables 3 and 4.

$$W1\ [\%]=(n1/S1)\times 100,$$

$$W2\ [\%]=(n2/S2)\times 100.$$

With respect to each of Examples 1 to 15 and Comparative Examples 1 and 2, an autoclave test was performed to check the presence or absence of low temperature degradation of the composite ceramic material. That is, after the autoclave test was performed for 100 hours under a severe condition of 121° C. and 1.15 MPa, a monoclinic $ZrO_2$ amount was measured, and then compared with the monoclinic $ZrO_2$ amount measured before the test. Results are shown in Table 3.

With respect to all of Examples, as shown in Tables 1 and 2, the $Al_2O_3$ dispersion ratio W1 is more than 2%, and the $ZrO_2$ dispersion ratio W2 is less than 10%. In addition, no significant phase transition of tetragonal $ZrO_2$ to the monoclinic $ZrO_2$ by the autoclave test was observed.

In Comparative Example 1, the $ZrO_2$ dispersion ratio W2 is 15%. It is thought that this increase in the $ZrO_2$ dispersion ratio W2 is associated with a considerable decrease in bending strength. In Comparative Example 2, the amount of the monoclinic $ZrO_2$ increased from 1.8 vol % to 25 vol % by the autoclave test. It is thought that this increase in the monoclinic-$ZrO_2$ amount is associated with a considerable decrease in fracture toughness. In comparative Examples 3 and 4, since the $Al_2O_3$ content in composite ceramic material is less than 20 vol %, the effect of preventing the grain growth of $ZrO_2$ was not enough, and the bending strength lowered. On the other hand, in Comparative Example 5, the bending strength considerably lowered because the $Al_2O_3$ content is more than 60 vol %.

As understood from the Examples described above, the $ZrO_2$—$Al_2O_3$ composite ceramic material of the present invention characterized by using 10 to 12 mol % of $CeO_2$ as the stabilizer in combination with the extremely small amount (0.005 to less than 0.5 mol %) of $Y_2O_3$ simultaneously prevents both of a decrease in bending strength caused by the abnormal grain growth of $ZrO_2$ that is a major disadvantage of the Ce-TZP ceramic, and the phase transformation to monoclinic $ZrO_2$ closely associated with low temperature degradation that is a major disadvantage of the Y-TZP ceramic, to demonstrate excellent mechanical strength and toughness.

Therefore, it is expected that the composite ceramic material of the present invention is widely utilized in various application fields, for example, parts for industrial machine such as ferrules for optical fiber connector, bearings and dies, cutting tools such as scissors and saw blades, stationery goods, chemical goods such as mechanical seals and miling media, goods for sport, medical equipments such as surgical knives, biomaterial parts such as artificial joint, artificial bone, artificial dental root, abutment and crown.

TABLE 1

| | Starting Material | | | Composite Ceramic Material | |
|---|---|---|---|---|---|
| | First Phase (mol %) | | Second Phase (vol %) | Average Grain Size (μm) | |
| | CeO$_2$ | Y$_2$O$_3$ | Al$_2$O$_3$ | ZrO$_2$ | Al$_2$O$_3$ |
| EXAMPLE 1 | 10 | 0.020 | 30 | 0.69 | 0.38 |
| EXAMPLE 2 | 10 | 0.030 | 30 | 0.63 | 0.35 |
| EXAMPLE 3 | 10 | 0.170 | 30 | 0.45 | 0.31 |
| EXAMPLE 4 | 10 | 0.330 | 30 | 0.39 | 0.27 |
| EXAMPLE 5 | 10 | 0.470 | 30 | 0.37 | 0.30 |
| EXAMPLE 6 | 11 | 0.010 | 30 | 0.73 | 0.40 |
| EXAMPLE 7 | 11 | 0.070 | 30 | 0.55 | 0.30 |
| EXAMPLE 8 | 11 | 0.300 | 30 | 0.40 | 0.27 |
| EXAMPLE 9 | 11 | 0.370 | 30 | 0.39 | 0.27 |
| EXAMPLE 10 | 11 | 0.430 | 30 | 0.38 | 0.30 |
| EXAMPLE 11 | 12 | 0.005 | 30 | 0.78 | 0.43 |
| EXAMPLE 12 | 12 | 0.100 | 30 | 0.50 | 0.30 |
| EXAMPLE 13 | 12 | 0.230 | 30 | 0.42 | 0.27 |
| EXAMPLE 14 | 12 | 0.400 | 30 | 0.38 | 0.27 |
| EXAMPLE 15 | 12 | 0.490 | 30 | 0.37 | 0.30 |
| COMPARATIVE EXAMPLE 1 | 10 | 0 | 30 | 1.00 | 0.38 |
| COMPARATIVE EXAMPLE 2 | 12 | 1.000 | 30 | 0.35 | 0.28 |

TABLE 2

| | Starting Material | | | Composite Ceramic Material | |
|---|---|---|---|---|---|
| | First Phase (mol %) | | Second Phase (vol %) | Average Grain Size (μm) | |
| | CeO$_2$ | Y$_2$O$_3$ | Al$_2$O$_3$ | ZrO$_2$ | Al$_2$O$_3$ |
| COMPARATIVE EXAMPLE 3 | 10 | 0.45 | 0 | 2.50 | — |
| COMPARATIVE EXAMPLE 4 | 10 | 0.45 | 10 | 1.00 | 0.25 |
| EXAMPLE 16 | 10 | 0.45 | 20 | 0.58 | 0.26 |
| EXAMPLE 17 | 10 | 0.45 | 30 | 0.35 | 0.28 |
| EXAMPLE 18 | 10 | 0.45 | 40 | 0.32 | 0.29 |
| EXAMPLE 19 | 10 | 0.45 | 50 | 0.29 | 0.30 |
| EXAMPLE 20 | 10 | 0.45 | 60 | 0.27 | 0.31 |
| COMPARATIVE EXAMPLE 5 | 10 | 0.45 | 70 | 0.26 | 0.32 |

TABLE 3

| | 3-point Bending Strength (MPa) | Fracture Toughness (MPa·m$^{1/2}$) | Al$_2$O$_3$ Dispersion Ratio W1 (%) | ZrO$_2$ Dispersion Ratio W2 (%) | Autoclave Test: Amounts of Monoclinic ZrO$_2$ (vol %) | |
|---|---|---|---|---|---|---|
| | | | | | Before Test | After Test |
| EXAMPLE 1 | 1050 | 18.8 | 3.4 | 7.8 | 4.1 | 4.2 |
| EXAMPLE 2 | 1100 | 18.6 | 3.1 | 7.0 | 3.8 | 3.7 |
| EXAMPLE 3 | 1240 | 18.4 | 3.3 | 4.2 | 3.6 | 3.7 |
| EXAMPLE 4 | 1290 | 18.2 | 3.1 | 2.5 | 4.2 | 4.1 |
| EXAMPLE 5 | 1280 | 18.0 | 2.5 | 2.1 | 3.9 | 4.0 |
| EXAMPLE 6 | 1120 | 15.5 | 3.3 | 8.5 | 3.1 | 3.2 |
| EXAMPLE 7 | 1230 | 15.4 | 3.0 | 6.0 | 2.9 | 2.8 |
| EXAMPLE 8 | 1330 | 15.2 | 3.2 | 2.7 | 3.3 | 3.5 |
| EXAMPLE 9 | 1310 | 15.0 | 3.1 | 2.4 | 3.4 | 3.3 |
| EXAMPLE 10 | 1290 | 14.8 | 2.6 | 2.2 | 3.2 | 3.1 |
| EXAMPLE 11 | 1200 | 11.5 | 3.2 | 9.3 | 2.6 | 2.5 |
| EXAMPLE 12 | 1350 | 11.3 | 3.1 | 5.0 | 2.9 | 2.8 |
| EXAMPLE 13 | 1400 | 11.2 | 3.2 | 3.2 | 2.3 | 2.5 |
| EXAMPLE 14 | 1400 | 11.1 | 3.1 | 2.3 | 2.7 | 2.8 |
| EXAMPLE 15 | 1450 | 11.1 | 2.5 | 2.0 | 2.8 | 2.6 |
| COMPARATIVE EXAMPLE 1 | 950 | 18.9 | 3.6 | 15.0 | 3.6 | 3.7 |
| COMPARATIVE EXAMPLE 2 | 1300 | 8.5 | 2.5 | 1.8 | 1.8 | 25.0 |

TABLE 4

| | 3-point Bending Strength (MPa) | Fracture Toughness (MPa · m$^{1/2}$) | Al$_2$O$_3$ Dispersion Ratio W1(%) | ZrO$_2$ Dispersion Ratio W2(%) |
|---|---|---|---|---|
| COMPARATIVE EXAMPLE 3 | 700 | 23.0 | — | 25.2 |
| COMPARATIVE EXAMPLE 4 | 1010 | 22.3 | 3.0 | 13.3 |
| EXAMPLE 16 | 1170 | 21.0 | 2.9 | 4.8 |
| EXAMPLE 17 | 1290 | 18.9 | 2.8 | 2.1 |
| EXAMPLE 18 | 1340 | 16.0 | 2.6 | 1.8 |
| EXAMPLE 19 | 1270 | 12.5 | 2.3 | 1.6 |
| EXAMPLE 20 | 1100 | 8.5 | 2.1 | 1.5 |
| COMPARATIVE EXAMPLE 5 | 750 | 4.5 | 1.4 | 1.3 |

What is claimed is:

1. A ZrO$_2$—Al$_2$O$_3$ composite ceramic material comprising:
   a first phase of ZrO$_2$ grains having an average grain size of 0.1 to 0.8 µm, and comprising 10 to 12 mol % of CeO$_2$ and 0.005 mol % to 0.17 mol % of Y$_2$O$_3$, said ZrO$_2$ grains composed of 90 vol % or more of tetragonal ZrO$_2$; and
   a second phase of Al$_2$O$_3$ grains having an average grain size of 0.1 to 0.5 µm, a content of said second phase in the composite ceramic material being in a range of 20 to 60 vol %.

2. The composite ceramic material as set forth in claim 1, wherein a content of said second phase in the composite ceramic material is in a range of 30 to 50 vol %.

3. The composite ceramic material as set forth in claim 1, wherein a ratio of the number of said Al$_2$O$_3$ grains dispersed within said ZrO$_2$ grains relative to the number of the entire Al$_2$O$_3$ grains dispersed in the composite ceramic material is 0.02 or more.

4. The composite ceramic material as set forth in claim 1, wherein a ratio of the number of said ZrO$_2$ grains that are two or more times larger than the average grain size of said first phase relative to the number of the entire ZrO$_2$ grains dispersed in the composite ceramic material is 0.10 or less.

5. A ZrO$_2$—Al$_2$O$_3$ composite ceramic material as claimed in claim 1, wherein said first phase comprises 10 to 12 mol % of CeO$_2$ and 0.005 mol % to 0.100 mol % of Y$_2$O$_3$.

6. A ZrO$_2$—Al$_2$O$_3$ composite ceramic material as claimed in claim 1, wherein said first phase comprises 10 to 12 mol % of CeO$_2$ and 0.005 mol % to 0.070 mol % of Y$_2$O$_3$.

7. A ZrO$_2$—Al$_2$O3 composite ceramic material as claimed in claim 1, wherein said first phase comprises 10 to 12 mol % of CeO$_2$ and 0.005 mol % to 0.030 mol % of Y$_2$O$_3$.

8. A ZrO$_2$—Al$_2$O$_3$ composite ceramic material as claimed in claim 1, wherein said ZrO$_2$ grains are composed of more than 95 vol % of tetragonal ZrO$_2$ with a balance of monoclinic ZrO$_2$.

9. A ZrO$_2$—Al$_2$O$_3$ composite ceramic material as claimed in claim 2, wherein said ZrO$_2$ grains are composed of more than 95 vol % of tetragonal ZrO$_2$ with a balance of monoclinic ZrO$_2$.

10. A ZrO$_2$—Al$_2$O$_3$ composite ceramic material as claimed in claim 3, wherein said ZrO$_2$ grains are composed of more than 95 vol % of tetragonal ZrO$_2$ with a balance of monoclinic ZrO$_2$.

11. A ZrO$_2$—Al$_2$O$_3$ composite ceramic material as claimed in claim 4, wherein said ZrO$_2$ grains are composed of more than 95 vol % of tetragonal ZrO$_2$ with a balance of monoclinic ZrO$_2$.

12. A ZrO$_2$—Al$_2$O$_3$ composite ceramic material as claimed in claim 5, wherein said ZrO$_2$ grains are composed of more than 95 vol % of tetragonal ZrO$_2$ with a balance of monoclinic ZrO$_2$.

13. A ZrO$_2$—Al$_2$O$_3$ composite ceramic material as claimed in claim 6, wherein said ZrO$_2$ grains are composed of more than 95 vol % of tetragonal ZrO$_2$ with a balance of monoclinic ZrO$_2$.

14. A ZrO$_2$—Al$_2$O$_3$ composite ceramic material as claimed in claim 7, wherein said ZrO$_2$ grains are composed of more than 95 vol % of tetragonal ZrO$_2$ with a balance of monoclinic ZrO$_2$.

15. A ZrO$_2$—Al$_2$O$_3$ composite ceramic material as set forth in claim 1, wherein a content of said second phase in the composite ceramic material is in a range of 30 to 50 vol %, wherein said Al$_2$O$_3$ grains have an average grain size of 0.26 to 0.40 µm, wherein said ZrO$_2$ grains are composed of more than 95 vol % of tetragonal ZrO$_2$ with a balance of monoclinic ZrO$_2$, and wherein said ZrO$_2$ grains have an average grain size of 0.27 to 0.73 µm.

16. A ZrO$_2$—Al$_2$O$_3$ composite ceramic material as set forth in claim 3, wherein a content of said second phase in the composite ceramic material is in a range of 30 to 50 vol %, wherein said Al$_2$O$_3$ grains have an average grain size of 0.26 to 0.40 µm, wherein said ZrO$_2$ grains are composed of more than 95 vol % of tetragonal ZrO$_2$ with a balance of monoclinic ZrO$_2$, and wherein said ZrO$_2$ grains have an average grain size of 0.27 to 0.73 µm.

17. A ZrO$_2$—Al$_2$O$_3$ composite ceramic material as set forth in claim 4, wherein a content of said second phase in the composite ceramic material is in a range of 30 to 50 vol %, wherein said Al$_2$O$_3$ grains have an average grain size of 0.26 to 0.40 µm, wherein said ZrO$_2$ grains are composed of more than 95 vol % of tetragonal ZrO$_2$ with a balance of monoclinic ZrO$_2$, and wherein said ZrO$_2$ grains have an average grain size of 0.27 to 0.73 µm.

18. A ZrO$_2$—Al$_2$O$_3$ composite ceramic material as set forth in claim 5, wherein a content of said second phase in the composite ceramic material is in a range of 30 to 50 vol %, wherein said Al$_2$O$_3$ grains have an average grain size of 0.26 to 0.40 µm, wherein said ZrO$_2$ grains are composed of more than 95 vol % of tetragonal ZrO$_2$ with a balance of monoclinic ZrO$_2$, and wherein said ZrO$_2$ grains have an average grain size of 0.27 to 0.73 µm.

19. A ZrO$_2$—Al$_2$O$_3$ composite ceramic material as set forth in claim 6, wherein a content of said second phase in the composite ceramic material is in a range of 30 to 50 vol %, wherein said Al$_2$O$_3$ grains have an average grain size of 0.26 to 0.40 µm, wherein said ZrO$_2$ grains are composed of more than 95 vol % of tetragonal ZrO$_2$ with a balance of monoclinic ZrO$_2$, and wherein said ZrO$_2$ grains have an average grain size of 0.27 to 0.73 µm.

20. A ZrO$_2$—Al$_2$O3 composite ceramic material as set forth in claim 7, wherein a content of said second phase in the composite ceramic material is in a range of 30 to 50 vol %, wherein said Al$_2$O$_3$ grains have an average grain size of 0.26 to 0.40 µm, wherein said ZrO$_2$ grains are composed of more than 95 vol % of tetragonal ZrO$_2$ with a balance of monoclinic ZrO$_2$, and wherein said ZrO$_2$ grains have an average grain size of 0.27 to 0.73 µm.

* * * * *

UNITED STATES PATENT AND TRADEMARK OFFICE
CERTIFICATE OF CORRECTION

PATENT NO. : 7,056,851 B2  Page 1 of 1
APPLICATION NO. : 10/921841
DATED : June 6, 2006
INVENTOR(S) : Masahiro Nawa It is certified that error appears in the above-identified patent and that said Letters Patent is hereby corrected as shown below:

Column 8, line 64, "miling" should read --milling--.

Column 11, line 49, "Al$_2$O3" should read --Al$_2$O$_3$--.

Column 12, line 57, "Al$_2$O3" should read --Al$_2$O$_3$--.

Signed and Sealed this

Second Day of January, 2007

JON W. DUDAS
*Director of the United States Patent and Trademark Office*